(12) United States Patent
Aarebrot et al.

(10) Patent No.: US 8,657,940 B2
(45) Date of Patent: Feb. 25, 2014

(54) SEPARATION AND CAPTURE OF LIQUIDS OF A MULTIPHASE FLOW

(75) Inventors: Eivind Aarebrot, Hommersåk (NO); Jan Høydal, Stavanger (NO)

(73) Assignee: Statoil ASA, Stavanger (NO)

( * ) Notice: Subject to any disclaimer, the term of this patent is extended or adjusted under 35 U.S.C. 154(b) by 404 days.

(21) Appl. No.: 12/919,612

(22) PCT Filed: Feb. 25, 2009

(86) PCT No.: PCT/NO2009/000064
§ 371 (c)(1),
(2), (4) Date: Nov. 30, 2010

(87) PCT Pub. No.: WO2009/108063
PCT Pub. Date: Sep. 3, 2009

(65) Prior Publication Data
US 2011/0072975 A1  Mar. 31, 2011

(30) Foreign Application Priority Data
Feb. 28, 2008  (NO) .................................. 20081061

(51) Int. Cl.
*B01D 19/00*  (2006.01)
(52) U.S. Cl.
USPC .................... 96/188; 96/157; 96/194; 96/195; 96/204; 96/208; 96/216; 96/182; 55/447
(58) Field of Classification Search
USPC ........... 96/188, 194, 195, 204, 208, 216, 157, 96/182; 55/447
See application file for complete search history.

(56) References Cited

U.S. PATENT DOCUMENTS

| 1,496,090 | A | 6/1924 | Marker et al. |
| 1,559,115 | A | 10/1925 | Marker et al. |
| 2004/0168572 | A1* | 9/2004 | Hopper ........................... 95/261 |
| 2005/0252837 | A1* | 11/2005 | Haland ............................ 210/97 |
| 2010/0180769 | A1* | 7/2010 | Grenstad et al. ................ 95/260 |

FOREIGN PATENT DOCUMENTS

| EP | 1352679 | 10/2003 |
| EP | 1600215 | 11/2005 |
| FR | 2911794 A1 | 8/2008 |
| WO | WO 01/00296 A1 | 1/2001 |
| WO | WO 01/83075 A1 | 11/2001 |
| WO | WO 02/056999 A1 | 7/2002 |
| WO | WO03/080212 | 10/2003 |
| WO | WO 2004/080565 A1 | 9/2004 |
| WO | WO 2004/080566 A1 | 9/2004 |
| WO | WO 2006/085759 A1 | 8/2006 |
| WO | WO 2007/001174 A1 | 1/2007 |
| WO | WO2007/071664 | 6/2007 |

OTHER PUBLICATIONS

European Search Report for European Application No. EP09713994 dated Jan. 10, 2012.

\* cited by examiner

*Primary Examiner* — Dung H Bui
(74) *Attorney, Agent, or Firm* — Patterson Thuente Pedersen, P.A.

(57) ABSTRACT

Assembly to separate a multiphase flow, comprising at least one compact separation unit chosen among an in-line deliquidiser and an in-line phase splitter, said compact separation unit is arranged to receive the multiphase flow for separation thereof to a gas flow and a mainly liquid containing flow, an outlet for gas, arranged to receive the gas flow from the compact separation unit and possible additional gas flows, one or more conduit separators, arranged to receive the mainly liquid containing flow from the compact separation unit and any additional liquid containing flows, having an outlet for liquid from the at least one conduit separator in a low-lying part thereof.

29 Claims, 2 Drawing Sheets

SEPARATION AND CAPTURE OF LIQUIDS OF A MULTIPHASE FLOW

PRIORITY CLAIM

The present application is a National Phase entry of PCT Application No. PCT/NO2009/000064, filed Feb. 25, 2009, which claims priority from Norway Application No. 20081061, filed Feb. 28, 2008, the disclosures of which are hereby incorporated by reference herein in their entirety.

TECHNICAL FIELD

The present invention concerns separation of a multiphase flow. More particularly the invention concerns an assembly for separation of a multiphase flow, where said assembly is especially applicable for underwater production and transport systems.

BACKGROUND ART

For separation of a multiphase flow traditional separation, devices in the form of containers are applied. Such containers are often large and heavy and must be constructed in accordance to design codes for pressure containers. If there is danger of liquid slugs, the container volume must be sufficiently large in order to handle a liquid slug. For application at deep sea depths, conventional separators may be too heavy to be handled with the aid of conventional vessels and lifting devices. If equipments inside a conventional separator are destroyed or lose their effectiveness in time, the whole separator must be raised for replacements, alternatively that the separator must be opened for repair. The separation efficiency in relation to the weight of equipment may advantageously be improved. There is a need for an assembly for multiphase separation with advantageous properties as regards to production, installation, operation, maintenance, replacement of single components in the assembly and separation effect in relation to weight.

SUMMARY OF THE INVENTION

With the present invention an assembly is provided for separation of a multiphase flow, which is characterized in that the assembly comprising: at least one compact separation unit chosen among an in-line deliquidiser and an in-line phase splitter, said compact separation unit is arranged to receive multiphase flow for separation thereof to a gas flow and a mainly liquid containing flow, a gas outlet arranged to receive the gas flow from the compact separation unit and any additional gas flows, one or more conduit separators arranged to receive the mainly liquid containing flow from the compact separation unit and any further liquid containing flows, with a liquid outlet from the at least one conduit separator in a low-lying part thereof.

The assembly according to the invention comprises therefore at least one inline phase splitter or one in-line deliquidiser, optionally one other equivalent compact separation unit arranged upstream of the at least one conduit separator.

In a preferred embodiment the assembly comprises: an in-line deliquidiser arranged to receive the multiphase flow for separation thereof to a gas flow and a mainly liquid containing flow, a gas outlet arranged to receive the gas flow from the deliquidiser and any additional gas flows, one or more conduit separators, arranged to receive the mainly gas containing flow from the deliquidiser and any additional liquid containing flows, with an liquid outlet from the at least one conduit separator in a low-lying part thereof, and a pump or control valve arranged in said liquid outlet, said pump or control valve is controlled by a level provider in the at least one conduit separator.

The assembly comprises only prior art elements that are assembled to a combination with surprisingly good technical effect with regards to separation efficiency in relation to weight, and with highly advantageous properties with regard to production, installation, operation, maintenance and replacement of single elements in the assembly. The special arrangement of a pump or control valve arranged in said low-lying liquid outlet, said pump or control valve is controlled by a level provider in the at least one conduit separator, contributes to increased technical effect. For applications with sufficiently high pressure in the liquid outlet, for example as a result of high supply pressure from connecting valves, a control valve is applied; otherwise a pump is applied.

The assembly comprises advantageously additional components.

The assembly comprises preferably a phase splitter arranged upstream a deliquidiser to receive the multiphase flow for coarse separation thereof to a mainly gaseous flow supplied to the deliquidiser and a mainly liquid containing flow supplied to the at least one conduit separator. Preferably an ejector is arranged in connection to the conduit separator to lead liquid from the deliquidiser into the at least one conduit separator. The assembly is preferably protected against overpressure by at least one fast closing SIPPS-valve arranged on the inlet (SIPPS-subsea instrumented pressure protection system) for application under water, or at least one HIPP S-valve (high integrity pressure protection system) for application above water. Advantageously the assembly comprises at least one or more of an additional conduit separator with declining slope seen along the flow direction and arranged downstream end at a lower level than the at least one conduit separator for additional separation effect. This is especially desirable if three phase separation is performed, that is separation to gas, liquid formed hydrocarbons and water. Advantageously a third conduit separator is arranged between the outlet for mainly gas from the phase splitter and deliquidiser in such a way that gas is supplied from the third conduit separator to the deliquidiser, and liquid is supplied from the third conduit separator to the at least one conduit separator. Advantageously the assembly comprises an in-line desander, preferably arranged upstream the at least one conduit separator. Advantageously the assembly also comprises an in-line degasser, preferably arranged upstream the at least one conduit separator or in connection to the possible additional conduit separator, with supply of separated gas to the gas outlet from the assembly. Advantageously some or all conduit separators in the assembly have a declining slope along the direction of flow throughout at least a part of the length to obtain increased separation effect. Advantageously all the above mentioned components in the assembly, both obligatory and optional components, are constructed in accordance to conduit codes.

Said conduit separators are tubular separator units constructed in accordance to conduit code. The conduit separators have advantageously larger diameter than connected conduits, and are advantageously arranged as a number of parallel positioned conduit sections and with manifolds that interconnects the ends of the conduit sections when required so that a sufficient volume for separation and handling of any liquid slugs is provided. Such arranged conduit separator is often denoted as a finger type separator.

The deliquidiser is preferably an in-line deliquidiser for separation of a liquid from a multiphase fluid flow that flows through a conduit, comprising a mainly tubular coating that is arranged to constitute part of the actual conduit, a spin element that is located at the upstream end of the coating and is arranged to start rotation of the fluid flow so that it separates in a central zone that mainly contains gas, and in an outer, annular zone that mainly contains liquids, an outlet device for the gas comprising an outlet element arranged at a downstream end of the coating and has a central, axial precursor passage for the gas, a liquid collecting device comprising an annular space formed between the inner surface of the coating and an outer surface of the gas outlet element, and a barrier for the liquid that is formed at a downstream end of the gas outlet element, and an outlet device for the liquid comprising a container that is arranged to receive liquid from the annular space and from the barrier area, wherein an upper part of the container and a central part of the upstream end of the spin element are interconnected with the aid of a conduit for recirculation of gas that is carried by liquid running or falling down into the container, where the spin element has a central cavity and is provided with a number of arranged openings along the circumference for outflow of recirculated gas from the cavity. The deliquidiser is preferably in accordance with the patent publication WO 2002/056999, to which additional disclosures are referred and incorporated herein. The container is connected by a conduit to the at least one conduit separator, alternatively that the container goes directly over to the at least one conduit separator.

The phase splitter is preferably an in-line cyclone separator for separation of a mixture containing solid particles, liquid and/or gas to a lighter fraction and a heavier fraction, the phase splitter comprises an outer coating defining a flow path through which said mixture shall flow, having an outlet for the incoming mixture, a first outlet for the separated lighter fraction and another outlet for the separated heavier fraction, where the outer coating contains: a flow body along which the mixture that is to be separated may flow; at least one whirling element arranged between the flow body and the coating to start rotating the mixture to separate the mixture to a heavier fraction and a lighter fraction; an outlet element with a central, axial precursory inner passage connected to a first outlet to release the lighter fraction, and an outer surface that, together with an inner surface of the coating, defines an outer passage connected to the other outlet in order to release the heavier fraction, where the outlet element is equipped with one or more openings through which a lighter fraction may reach the inner passage, said openings are arranged slanting in respect to the axial direction. Such a phase splitter is disclosed in the patent publication EP 1600215 A1 to which further disclosures is referred. Such a phase splitter gives improved separation effect than a traditional T-bend.

The possible desander is an in-line device for separation of a mixture containing solid particles, liquid and/or gas to a heavier fraction and a lighter fraction, the desander comprises an outer coating that defines a flow path through which the mixture shall flow, a flow body along which the mixture that shall be separated may flow; at least one spin element arranged between the flow body and the outer coating, where the spin element defines an adjacent part, an intermediate part and a remote part, where the adjacent part is adjusted for gradually starting the rotation of the incoming mixture with the purpose to separate the mixture to a heavier fraction and a lighter fraction, and where the remote part of the spin element is adjusted to gradually reduce the rotation of the mixture with the purpose of re-establishing the pressure. Such in-line desanders are disclosed in the patent publications WO 2006/085759 A1 and WO 2007/001174 A1 to which additional disclosures are referred. An in-line desander is advantageously arranged in the assembly if the multiphase flow is expected to contain sand. Separated sand may as an example be transported to a suitable container for periodical replacement, or led to the sucking side of a pump, provided that the amount of sand is able to be handled by the pump. The in-line desander is advantageously connected to the outlet for mainly liquid from the phase splitter. However, the in-line desander may be arranged other places in the flow path for liquid, preferably in connection to the at least one conduit separator.

Preferably the optional in-line degasser comprises a tubular separation chamber having an upstream end where the fluid flow (mainly liquid) lead in by a spin element in the upstream end is put in rotation and separated to a heavier fraction that is mainly collected along the inside conduit wall of the separation chamber and taken out through an outlet in the downstream end of the separation chamber, and a lighter fraction that is mainly collected along the longitudinal axis of the separation chamber, from where an outlet conduit is arranged to supply the lighter fraction. The degasser may preferably be arranged in the flow path for liquid, most preferably in or connected to the optionally additional conduit separator, downstream the at least one conduit separator, and with supply of separated gas to the gas outlet from the assembly and supply of liquid further in the flow path for liquid. Preferable degassers are disclosed in the patent publications WO 01/00296 and WO 2004/080565, to which more detailed disclosures are referred.

The assembly according to the invention is preferably a sub-sea installation for separation arranged on the sea-bed close to subsea production wells for hydrocarbon production with further supply of liquid and gas to a subsea production and transport system. Optionally, one, both or more separated phases may be supplied to other purposes, for example injection. In addition, the assembly according to the invention may, however, be applied in process installation on platforms or inshore, or in transport systems inshore.

The design of the assembly according to the invention is adjusted to the actual separation requirements. However, the assembly comprises in any case components including at least one compact cyclone based separation unit, chosen among an in-line deliquidizer and an in-line phase splitter, where said compact cyclone based separation unit is arranged to receive multiphase flow for separation thereof to a gas flow and a mainly liquid containing flow, a gas outlet arranged to receive the gas flow from the compact cyclone based separation unit and any additional gas flows, and one or more conduit separators, arranged to receive the mainly liquid containing flow from the compact cyclone based separation unit and any additional liquid containing flows, having an outlet for liquid from the at least one conduit separator in a low-lying part thereof. The possible components give additional separation effect. The number of conduit sections in the respective conduit separators may be adjusted fairly freely, and more assemblies or components in the assembly may be connected in parallel, alternatively in series.

The assembly according to the invention, in particular for subsea application, is advantageously constructed in such a way that remote replacement of equipment units is feasible. Each single equipment unit in the assembly may preferably be disconnected with aid of a ROV (remotely controlled subsea vessel) and be lifted up with a conventional crane on a conventional intervention vessel in such a way that replacement and repair may be performed separately on the individual equipment units. Isolation valves are preferably arranged between the equipment units, where said valves are remotely operational by ROV or in other ways.

BRIEF DESCRIPTION OF THE DRAWINGS

The present invention may be more completely understood in consideration of the following detailed description of various embodiments of the invention in connection with the accompanying drawings, in which.

DETAILED DESCRIPTION

Figure 1:
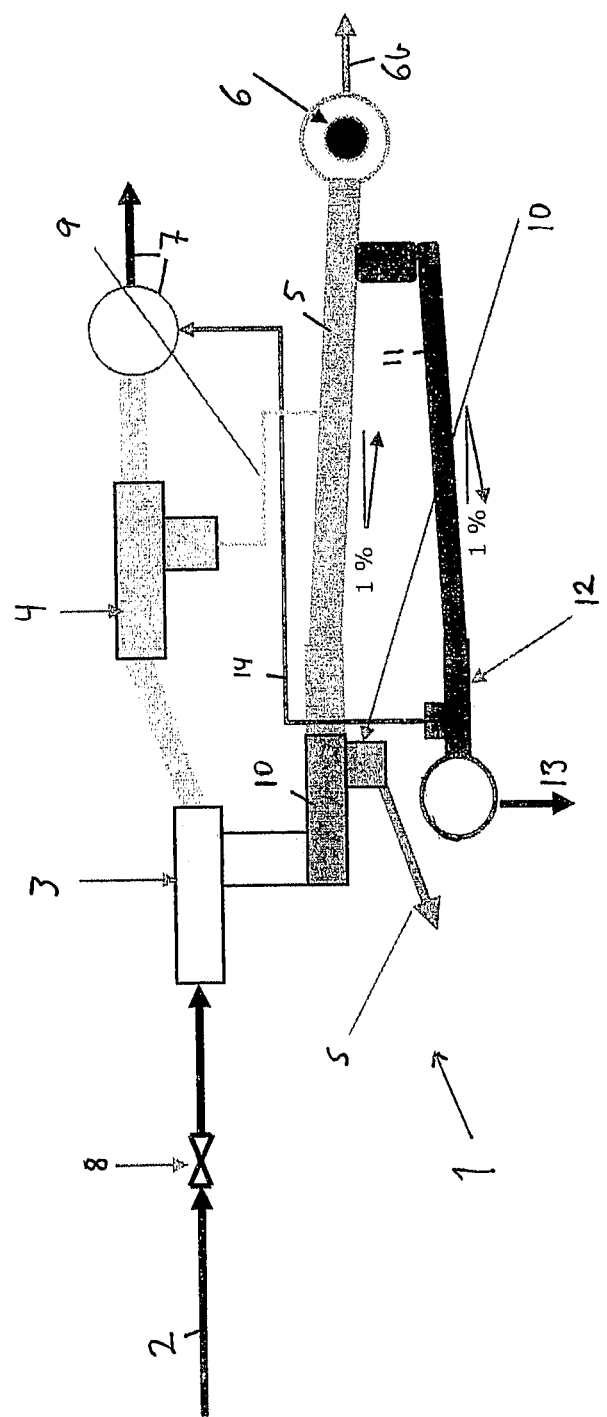
FIG. 1 is a schematic illustrating an assembly according to the invention.

Reference is made to FIG. 1 that illustrates an assembly according to the invention.

To the assembly a pipe 2 is supplied for input of a multiphase flow.

The assembly comprises: a phase splitter 3 that receives the multiphase flow for coarse separation thereof to a mainly gaseous flow and a mainly liquid containing flow. The mainly gaseous flow is guided from the phase splitter through a pipe to a deliquidiser 4. The mainly liquid state flow from the phase splitter is guided to a (first) conduit separator 5 that has a declining slope/incline throughout part of the length, and in the lower low-lying end a level controlled pump 6 is installed, controlled by the liquid level in the conduit separator, for supply of the liquid through a liquid outlet 6b. From the assembly a gas outlet 7 is arranged, in which gas is received from the deliquidiser 4 and any additional gas separated from the assembly. In the illustrated embodiment a SIPPS valve 8 is arranged in the inlet. An outlet for mainly liquid 9 from the deliquidiser is further illustrated, which outlet is guided into the conduit separator 5, preferably in an ejector (not illustrated) arranged with connection to the conduit separator. In the illustrated embodiment it is also arranged an in-line desander 10 between the outlet for mainly liquid from the phase splitter 3 and the conduit separator 5. Thereby sand may be captured/withdrawn, as indicated by arrow S. An additional (second) conduit separator 11 is also illustrated, connected the conduit separator and arranged with slope/incline in the flow direction, an in-line degasser 12 arranged in the lower part of the additional conduit separator and with an additional liquid outlet 13. Gas separated from the in-line degasser 12 is guided via a pipe 14 to the gas outlet from the assembly. The additional liquid outlet may typically be an outlet for water. The slope/incline in the conduit separator and the additional conduit separator, or a part of these, is preferably such that the level control of the pump or a control valve, natural flow and separation, is supported. The slope may as an example be 1°. However, it may very well be considerably higher, for example 5°, 10°, 30° or even 90°. For each application an evaluation of the suitable slope is performed.

Figure 2:
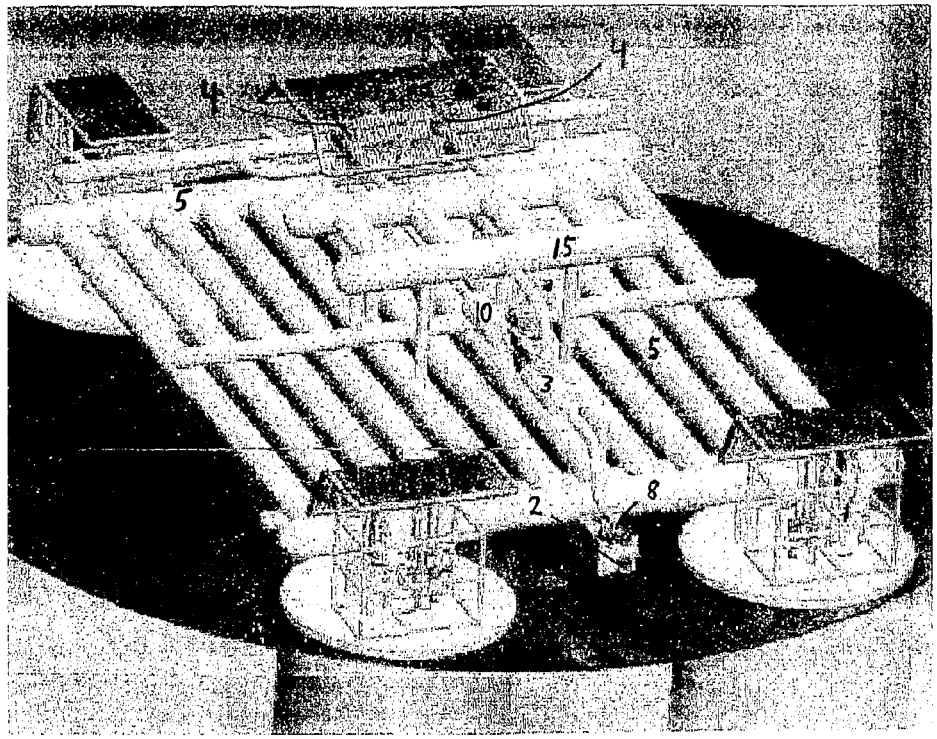
FIG. 2 that is an iso-3D drawing of an assembly according to the invention.

FIG. 2 is an iso-3D drawing of an assembly according to the invention, where corresponding components of equipment as in FIG. 1 are given corresponding reference numerals. A third conduit separator 15 is also illustrated in FIG. 2, arranged between the phase splitter 3 and the deliquidiser 4 so that gas is supplied/delivered through at least one pipe from the third conduit separator 15 to the deliquidiser 4, and liquid is supplied/delivered through at least one pipe from the third conduit separator 15 to the at least one (first) conduit separator 5. In the illustrated embodiment there are two deliquidisers 4 arranged in parallel receiving gas through respective pipes from the third conduit separator.

Figure 3:
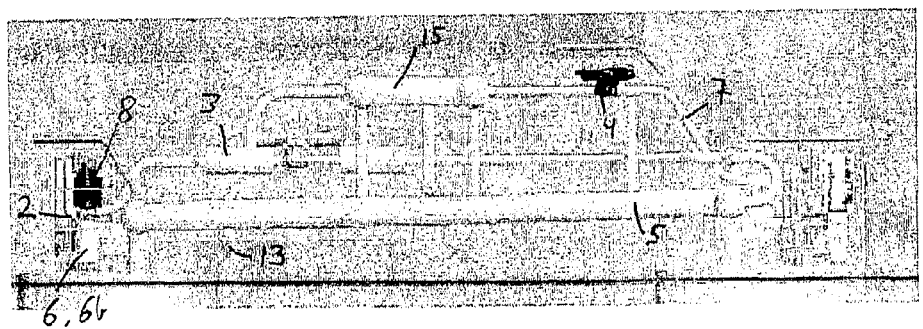
FIG. 3 showing a side view of FIG. 2.

FIG. 3 shows a side view of FIG. 2. 6b illustrates an oil outlet, while 13 illustrates a water outlet. The gas outlet 7 is located to the right in FIG. 3.

EXAMPLES

Technical effect of the invention is best illustrated by way of examples. An assembly according to the invention which is applied for a given separation requirement at an ocean depth of about 400 m would correspond to a weight of about 900 ton of pumps and have a liquid volume of 200 m$^2$, everything constructed as a unit or assembly with remotely controlled, replaceable equipment units. A conventional separation installation with corresponding separation effect is estimated to weigh about 2 200 ton. With the assembly according to the invention the weight is reduced to below half compared to a conventional installation. In addition, the individual equipment units in the assembly may be separately handled and replaced in a considerably better way.

At a deep sea field with ocean depths of about 1 400 m, it is estimated that an assembly according to the invention weighing 1 200 ton will have a liquid volume of 400 m$^3$. A conventional separation assembly with identical weight would have a liquid volume of 65 m$^3$ and rated for application at ocean depth of 200 m. This conventional assembly is installed at the field Tordis. Application of conventional separation assemblies at deep ocean depths would cause too high weight to enable convenient handling. By building all elements according to conduit code weight savings are achieved, more preferable possibilities for overpressure protection (SIPPS/HIPPS-valves may be applied, extensive emergency closure systems are avoided, and, in case of applications above water level, flaring is avoided), easier demands concerning resistance of collapsing pressure and easier documentation. Typical conduit components or sections may have a diameter of 50" (1.27 m), and length of for example 12 m. However, it is today possible to produce conduits of up to 100" (2.54 m) in diameter, in form of 5 m length molded conduits.

The assembly according to the invention has no particular limitations in respect to the amount of liquid present in the gas phase. The typical application is subsea transport systems, mainly transport of gas, but where considerable amount of liquid may periodically be present.

The invention claimed is:

1. An assembly for separation of a multiphase flow, comprising:
    at least one compact cyclone based separation unit, chosen from an in-line deliquidiser and an in-line phase splitter, where said compact cyclone based separation unit is arranged to receive multiphase flow via an inlet for separation thereof to a gas flow and a mainly liquid containing flow;
    a gas outlet arranged to receive the gas flow from the compact cyclone based separation unit and any additional gas flows;
    at least one conduit separator, arranged to receive the mainly liquid containing flow from compact cyclone based separation unit and any additional liquid containing flows, having an outlet for liquid from the at least one conduit separator in a low-lying part thereof; and
    at least one or more of an additional conduit separator with declining slope/incline seen along the direction of flow and arranged downstream and at a lower level than the at least one conduit separator, in order to obtain additional separation effect.

2. The assembly according to claim 1, wherein the at least one compact cyclone based separation unit is an in-line deliquidiser.

3. The assembly according to claim 2, further comprising a pump or control valve arranged in said outlet for liquid, said pump or control valve is controlled by a level of said liquid in the at least one conduit separator.

4. The assembly according to claim 2, further comprising a phase splitter arranged up-stream of the deliquidiser to receive the multiphase flow for coarse separation thereof to a mainly gas containing flow that is supplied/delivered via an outlet for mainly gas from said phase splitter to the deliquidiser and a mainly gas containing flow that is supplied/delivered to the at least one conduit separator.

5. The assembly according to claim 1, the at least one conduit separator having a length and wherein the at least one conduit separator has a declining slope/incline along the direction of flow throughout at least part of the length.

6. An assembly for separation of a multiphase flow, comprising:
- at least one compact cyclone based separation unit in the form of an in-line deliquidiser, where said compact cyclone based separation unit is arranged to receive multiphase flow via an inlet for separation thereof to a gas flow and a mainly liquid containing flow;
- a gas outlet arranged to receive the gas flow from the compact cyclone based separation unit and any additional gas flows;
- at least one conduit separator, arranged to receive the mainly liquid containing flow from the compact cyclone based separation unit and any additional liquid containing flows, having an outlet for liquid from the at least one conduit separator in a low-lying part thereof; and
- a phase splitter arranged up-stream of the deliquidiser to receive the multiphase flow for coarse separation thereof to a mainly gas containing flow that is supplied/delivered to the deliquidiser and a mainly gas containing flow that is supplied/delivered via an outlet for mainly gas from said splitter to the at least one conduit separator;
- wherein a third conduit separator is arranged between said outlet for mainly gas from the phase splitter and the deliquidiser so that gas is supplied/delivered from the third conduit separator to the deliquidiser and liquid is delivered from the third conduit separator to the at least one conduit separator.

7. The assembly according to claim 6, wherein the at least one compact cyclone based separation unit is an in-line deliquidiser.

8. The assembly according to claim 7, further comprising a pump or control valve arranged in said outlet for liquid, said pump or control valve is controlled by a level of said liquid in the at least one conduit separator.

9. The assembly according to claim 6, the at least one conduit separator having a length and wherein the at least one conduit separator has a declining slope/incline along the direction of flow throughout at least part of the length.

10. An assembly for separation of a multiphase flow, comprising:
- at least one compact cyclone based separation unit, chosen from an in-line deliquidiser and an in-line phase splitter, where said compact cyclone based separation unit is arranged to receive multiphase flow via an inlet for separation thereof to a gas flow and a mainly liquid containing flow;
- a gas outlet arranged to receive the gas flow from the compact cyclone based separation unit and any additional gas flows;
- at least one conduit separator, arranged to receive the mainly liquid containing flow from the compact cyclone based separation unit and any additional liquid containing flows, having an outlet for liquid from the at least one conduit separator in a low-lying part thereof; and
- an ejector arranged in connection to said at least one conduit separator to guide liquid from said deliquidiser into said at least one conduit separator.

11. The assembly according to claim 10, wherein the at least one compact cyclone based separation unit is an in-line deliquidiser.

12. The assembly according to claim 11, further comprising a pump or control valve arranged in said outlet for liquid, said pump or control valve is controlled by a level of said liquid in the at least one conduit separator.

13. The assembly according to claim 11, further comprising a phase splitter arranged up-stream of the deliquidiser to receive the multiphase flow for coarse separation thereof to a mainly gas containing flow that is supplied/delivered via an outlet for mainly gas from said phase splitter to the deliquidiser and a mainly gas containing flow that is supplied/delivered to the at least one conduit separator.

14. The assembly according to claim 10, the at least one conduit separator having a length and wherein the at least one conduit separator has a declining slope/incline along the direction of flow throughout at least part of the length.

15. An assembly for separation of a multiphase flow, comprising:
- an inlet at least one compact cyclone based separation unit, chosen from an in-line deliquidiser and an in-line phase splitter, where said compact cyclone based separation unit is arranged to receive multiphase flow via the inlet for separation thereof to a gas flow and a mainly liquid containing flow;
- a gas outlet arranged to receive the gas flow from the compact cyclone based separation unit and any additional gas flows;
- at least one conduit separator, arranged to receive the mainly liquid containing flow from the compact cyclone based separation unit and any additional liquid containing flows, having an outlet for liquid from the at least one conduit separator in a low-lying part thereof; and
- at least one HIPPS/SIPPS valve for overpressure protection arranged in the inlet of the assembly.

16. The assembly according to claim 15, wherein the at least one compact cyclone based separation unit is an in-line deliquidiser.

17. The assembly according to claim 16, further comprising a pump or control valve arranged in said outlet for liquid, said pump or control valve is controlled by a level of said liquid in the at least one conduit separator.

18. The assembly according to claim 16, further comprising a phase splitter arranged up-stream of the deliquidiser to receive the multiphase flow for coarse separation thereof to a mainly gas containing flow that is supplied/delivered via an outlet for mainly gas from said phase splitter to the deliquidiser and a mainly gas containing flow that is supplied/delivered to the at least one conduit separator.

19. The assembly according to claim 15, the at least one conduit separator having a length and wherein the at least one conduit separator has a declining slope/incline along the direction of flow throughout at least part of the length.

20. An assembly for separation of a multiphase flow, comprising:
- at least one compact cyclone based separation unit, chosen from an in-line deliquidiser and an in-line phase splitter, where said compact cyclone based separation unit is arranged to receive multiphase flow via an inlet for separation thereof to a gas flow and a mainly liquid containing flow;

a gas outlet arranged to receive the gas flow from the compact cyclone based separation unit and any additional gas flows;

at least one conduit separator, arranged to receive the mainly liquid containing flow from the compact cyclone based separation unit and any additional liquid containing flows, having an outlet for liquid from the at least one conduit separator in a low-lying part thereof; and at least one in-line desander arranged in connection to the at least one conduit separator.

21. The assembly according to claim 20, wherein the at least one compact cyclone based separation unit is an in-line deliquidiser.

22. The assembly according to claim 21, further comprising a pump or control valve arranged in said outlet for liquid, said pump or control valve is controlled by a level of said liquid in the at least one conduit separator.

23. The assembly according to claim 21, further comprising a phase splitter arranged up-stream of the deliquidiser to receive the multiphase flow for coarse separation thereof to a mainly gas containing flow that is supplied/delivered via an outlet for mainly gas from said phase splitter to the deliquidiser and a mainly gas containing flow that is supplied/delivered to the at least one conduit separator.

24. The assembly according to claim 20, the at least one conduit separator having a length and wherein the at least one conduit separator has a declining slope/incline along the direction of flow throughout at least part of the length.

25. An assembly for separation of a multiphase flow, comprising:

at least one compact cyclone based separation unit, chosen from an in-line deliquidiser and an in-line phase splitter, where said compact cyclone based separation unit is arranged to receive multiphase flow via an inlet for separation thereof to a gas flow and a mainly liquid containing flow;

a gas outlet arranged to receive the gas flow from the compact cyclone based separation unit and any additional gas flows;

at least one conduit separator, arranged to receive the mainly liquid containing flow from the compact cyclone based separation unit and any additional liquid containing flows, having an outlet for liquid from the at least one conduit separator in a low-lying part thereof; and at least one in-line degasser arranged downstream the at least one conduit separator or in connection to the possible additional conduit separator, with supply/delivery of separated gas to the gas outlet from the assembly.

26. The assembly according to claim 25, wherein the at least one compact cyclone based separation unit is an in-line deliquidiser.

27. The assembly according to claim 26, further comprising a pump or control valve arranged in said outlet for liquid, said pump or control valve is controlled by a level of said liquid in the at least one conduit separator.

28. The assembly according to claim 26, further comprising a phase splitter arranged up-stream of the deliquidiser to receive the multiphase flow for coarse separation thereof to a mainly gas containing flow that is supplied/delivered via an outlet for mainly gas from said phase splitter to the deliquidiser and a mainly gas containing flow that is supplied/delivered to the at least one conduit separator.

29. The assembly according to claim 25, the at least one conduit separator having a length and wherein the at least one conduit separator has a declining slope/incline along the direction of flow throughout at least part of the length.

* * * * *